(12) United States Patent
Brown (10) Patent No.: US 11,514,794 B1
(45) Date of Patent: Nov. 29, 2022

(54) VEHICULAR BLIND SPOT WARNING SYSTEM

(71) Applicant: Khari Brown, Atlanta, GA (US)

(72) Inventor: Khari Brown, Atlanta, GA (US)

(*) Notice: Subject to any disclaimer, the term of this patent is extended or adjusted under 35 U.S.C. 154(b) by 0 days.

(21) Appl. No.: 17/353,937

(22) Filed: Jun. 22, 2021

Related U.S. Application Data

(60) Provisional application No. 63/200,660, filed on Mar. 20, 2021.

(51) Int. Cl.
*G08G 1/16* (2006.01)
*B60Q 9/00* (2006.01)
*G08G 1/04* (2006.01)
*B60R 1/12* (2006.01)

(52) U.S. Cl.
CPC .............. *G08G 1/167* (2013.01); *B60Q 9/008* (2013.01); *B60R 1/1207* (2013.01); *G08G 1/04* (2013.01); *G08G 1/163* (2013.01); *G08G 1/165* (2013.01)

(58) Field of Classification Search
None
See application file for complete search history.

(56) References Cited

U.S. PATENT DOCUMENTS

| | | | |
|---|---|---|---|
| 6,970,074 B2 * | 11/2005 | Perlman | B60Q 1/305 340/475 |
| 7,965,197 B1 * | 6/2011 | Engelmann | B60Q 1/2665 340/441 |
| 2002/0080016 A1 * | 6/2002 | Keirstead | B60R 1/00 340/901 |
| 2004/0178892 A1 * | 9/2004 | Anderson | B60Q 1/2665 340/435 |
| 2007/0237517 A1 * | 10/2007 | Park | G03B 17/00 396/427 |
| 2010/0073480 A1 * | 3/2010 | Hoek | G01P 1/08 348/148 |
| 2013/0169425 A1 * | 7/2013 | Victor | B60Q 5/006 340/435 |
| 2017/0080861 A1 * | 3/2017 | Vora | B60R 1/00 |
| 2017/0088072 A1 * | 3/2017 | Curtis | G08B 31/00 |
| 2017/0162042 A1 * | 6/2017 | Dooley | G08G 1/166 |
| 2017/0259753 A1 * | 9/2017 | Meyhofer | H04N 13/204 |
| 2017/0345313 A1 * | 11/2017 | Kazemian | G08G 1/167 |
| 2018/0272947 A1 * | 9/2018 | Masckauchan | B60R 1/06 |
| 2021/0188163 A1 * | 6/2021 | Kern | B60Q 1/28 |
| 2021/0347293 A1 * | 11/2021 | Zeng | B60Q 1/0023 |
| 2021/0370886 A1 * | 12/2021 | Martin | B60S 1/54 |

* cited by examiner

*Primary Examiner* — Muhammad Adnan
(74) *Attorney, Agent, or Firm* — Kyle A. Fletcher, Esq.

(57) ABSTRACT

The vehicular blind spot warning system is a safety device. The vehicular blind spot warning system comprises a master alarm circuit, a plurality of sensor circuits, a plurality of remote alarm circuits, a personal data device, and a vehicle. The master alarm circuit mounts in the vehicle. The plurality of sensor circuits and the plurality of remote alarm circuits mount on the exterior surface of the vehicle. The personal data device forms a communication link with the master alarm circuit. The vehicular blind spot warning system monitors a 360 degree field of view around the vehicle. The vehicular blind spot warning system generates a plurality of audible and visible alarms when: a) the vehicular blind spot warning system detects traffic that is near to the vehicle; and, b) the vehicular blind spot warning system detects traffic that is moving in a dangerous direction relative to the vehicle.

19 Claims, 8 Drawing Sheets

VEHICULAR BLIND SPOT WARNING SYSTEM

CROSS REFERENCES TO RELATED APPLICATIONS

This non-provisional patent application claims priority to provisional patent application 63/200,660 that was filed on Mar. 22, 2021 by the applicant Khari Brown.

STATEMENT REGARDING FEDERALLY SPONSORED RESEARCH

Not Applicable

REFERENCE TO APPENDIX

Not Applicable

BACKGROUND OF THE INVENTION

Field of the Invention

The present invention relates to the field of transportation and vehicles, more specifically, a radar or analogous systems specially adapted for anti-collision purposes of land vehicles. (G01S13/931)

SUMMARY OF INVENTION

The vehicular blind spot warning system is a safety device. The vehicular blind spot warning system comprises a master alarm circuit, a plurality of sensor circuits, a plurality of remote alarm circuits, a personal data device, and a vehicle. The master alarm circuit mounts in the vehicle. The plurality of sensor circuits and the plurality of remote alarm circuits mount on the exterior surface of the vehicle. The personal data device forms a communication link with the master alarm circuit. The vehicular blind spot warning system monitors a 360 degree field of view around the vehicle. The vehicular blind spot warning system generates a plurality of audible and visible alarms when: a) the vehicular blind spot warning system detects traffic that is near to the vehicle; and, b) the vehicular blind spot warning system detects traffic that is moving in a dangerous direction relative to the vehicle.

These together with additional objects, features and advantages of the vehicular blind spot warning system will be readily apparent to those of ordinary skill in the art upon reading the following detailed description of the presently preferred, but nonetheless illustrative, embodiments when taken in conjunction with the accompanying drawings.

In this respect, before explaining the current embodiments of the vehicular blind spot warning system in detail, it is to be understood that the vehicular blind spot warning system is not limited in its applications to the details of construction and arrangements of the components set forth in the following description or illustration. Those skilled in the art will appreciate that the concept of this disclosure may be readily utilized as a basis for the design of other structures, methods, and systems for carrying out the several purposes of the vehicular blind spot warning system.

It is therefore important that the claims be regarded as including such equivalent construction insofar as they do not depart from the spirit and scope of the vehicular blind spot warning system. It is also to be understood that the phraseology and terminology employed herein are for purposes of description and should not be regarded as limiting.

BRIEF DESCRIPTION OF DRAWINGS

The accompanying drawings, which are included to provide a further understanding of the invention are incorporated in and constitute a part of this specification, illustrate an embodiment of the invention and together with the description serve to explain the principles of the invention. They are meant to be exemplary illustrations provided to enable persons skilled in the art to practice the disclosure and are not intended to limit the scope of the appended claims.

DETAILED DESCRIPTION OF THE EMBODIMENT

The following detailed description is merely exemplary in nature and is not intended to limit the described embodiments of the application and uses of the described embodiments. As used herein, the word "exemplary" or "illustrative" means "serving as an example, instance, or illustration." Any implementation described herein as "exemplary" or "illustrative" is not necessarily to be construed as preferred or advantageous over other implementations. All of the implementations described below are exemplary implementations provided to enable persons skilled in the art to practice the disclosure and are not intended to limit the scope of the appended claims. Furthermore, there is no intention to be bound by any expressed or implied theory presented in the preceding technical field, background, brief summary or the following detailed description.

Figure 1:
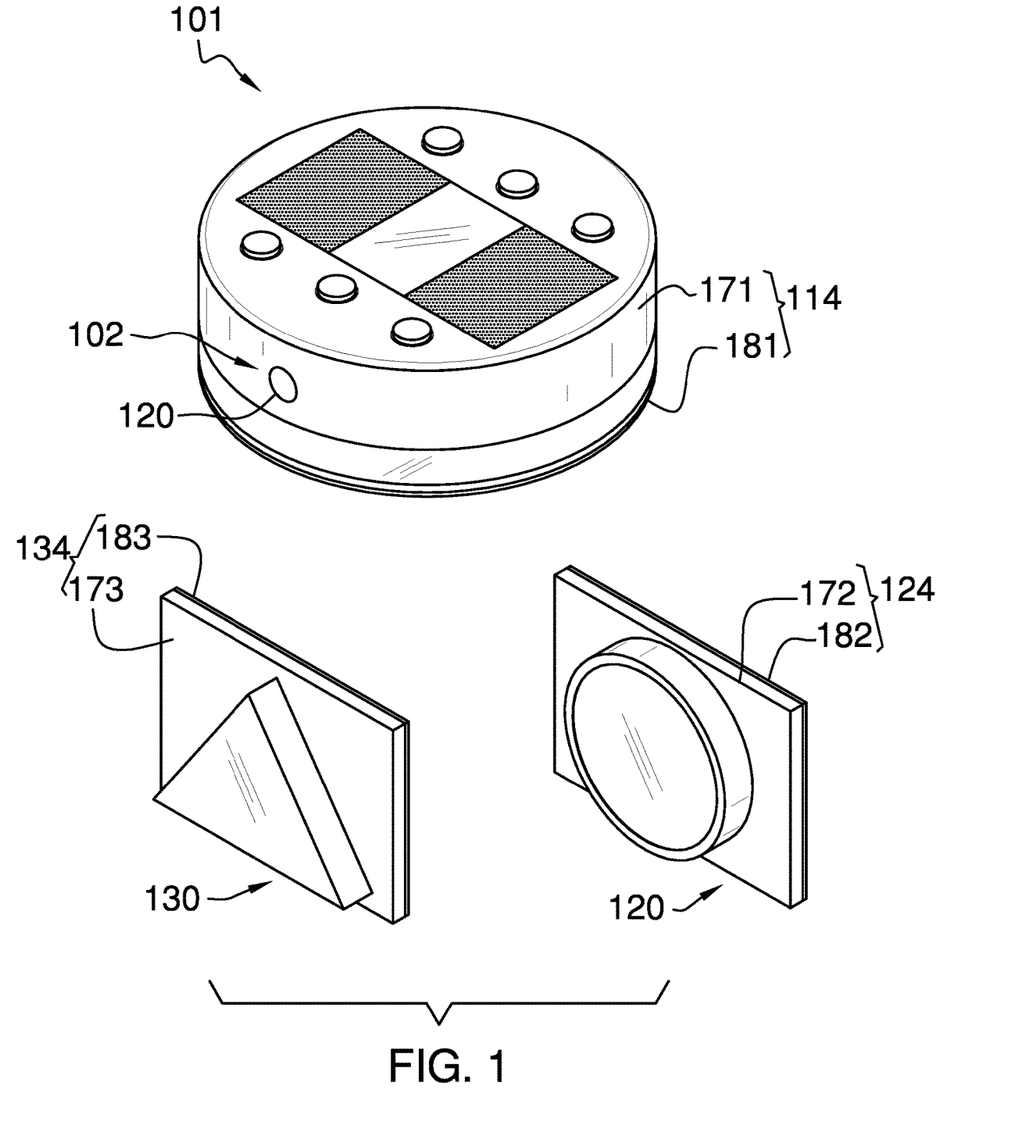
FIG. 1 is a perspective view of an embodiment of the disclosure.
Figure 2:
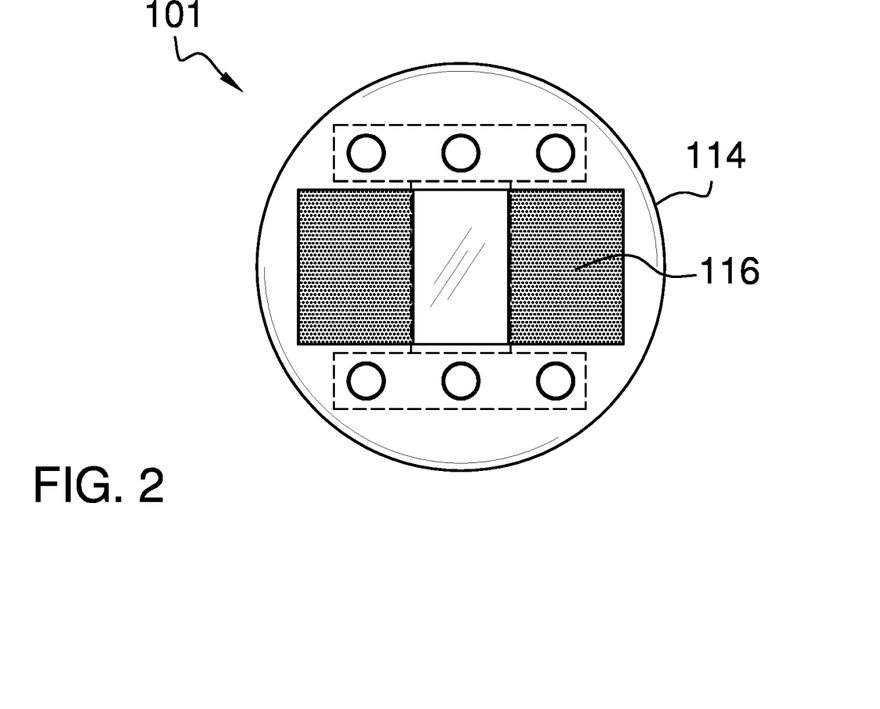
FIG. 2 is a top view of an embodiment of the disclosure.
Figure 3:
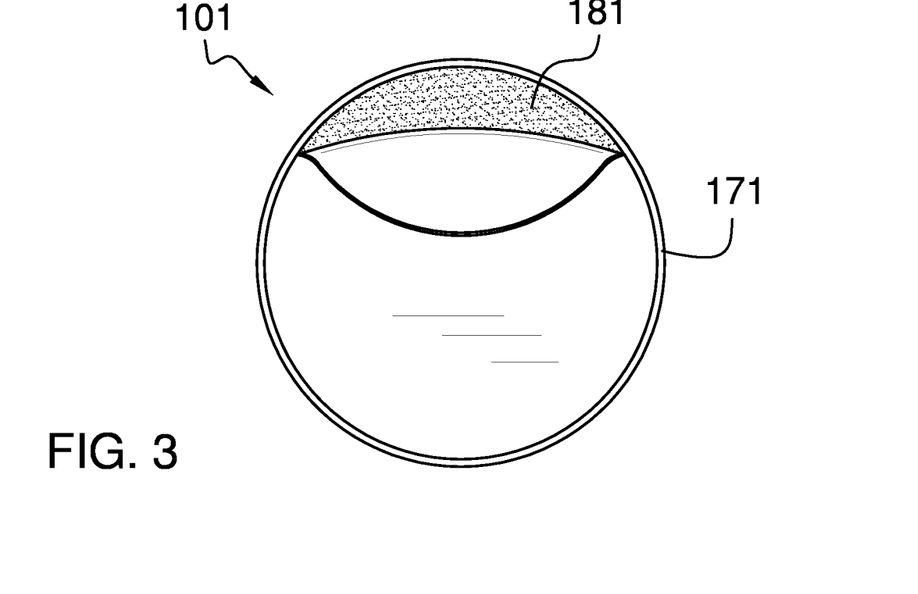
FIG. 3 is a bottom view of an embodiment of the disclosure.
Figure 4:
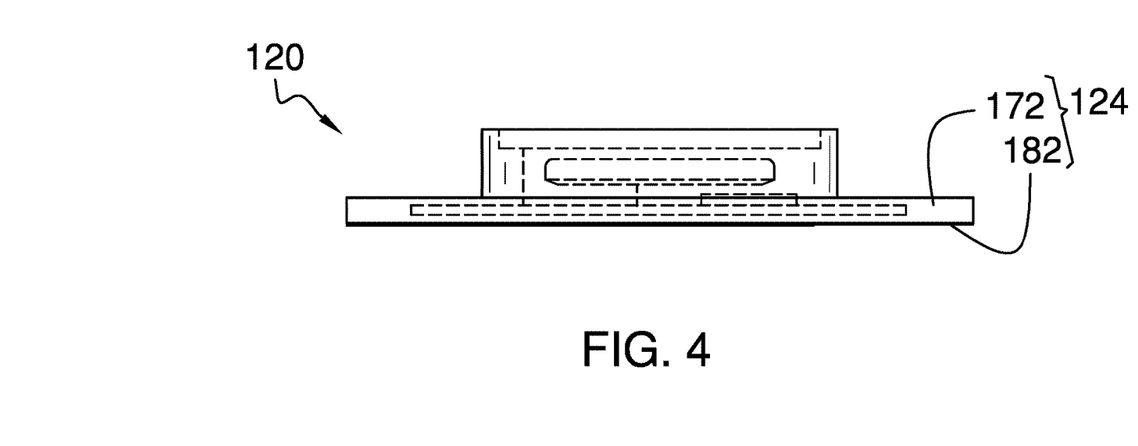
FIG. 4 is a side view of an embodiment of the disclosure.
Figure 5:
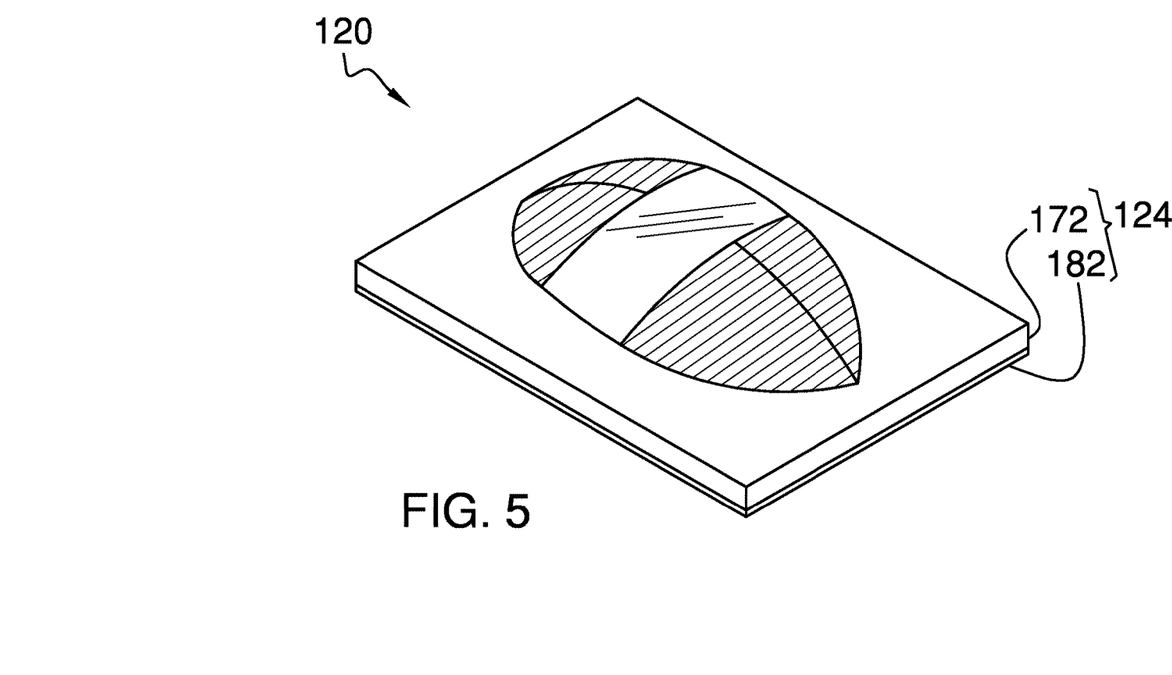
FIG. 5 is a perspective view of an embodiment of the disclosure.
Figure 6:
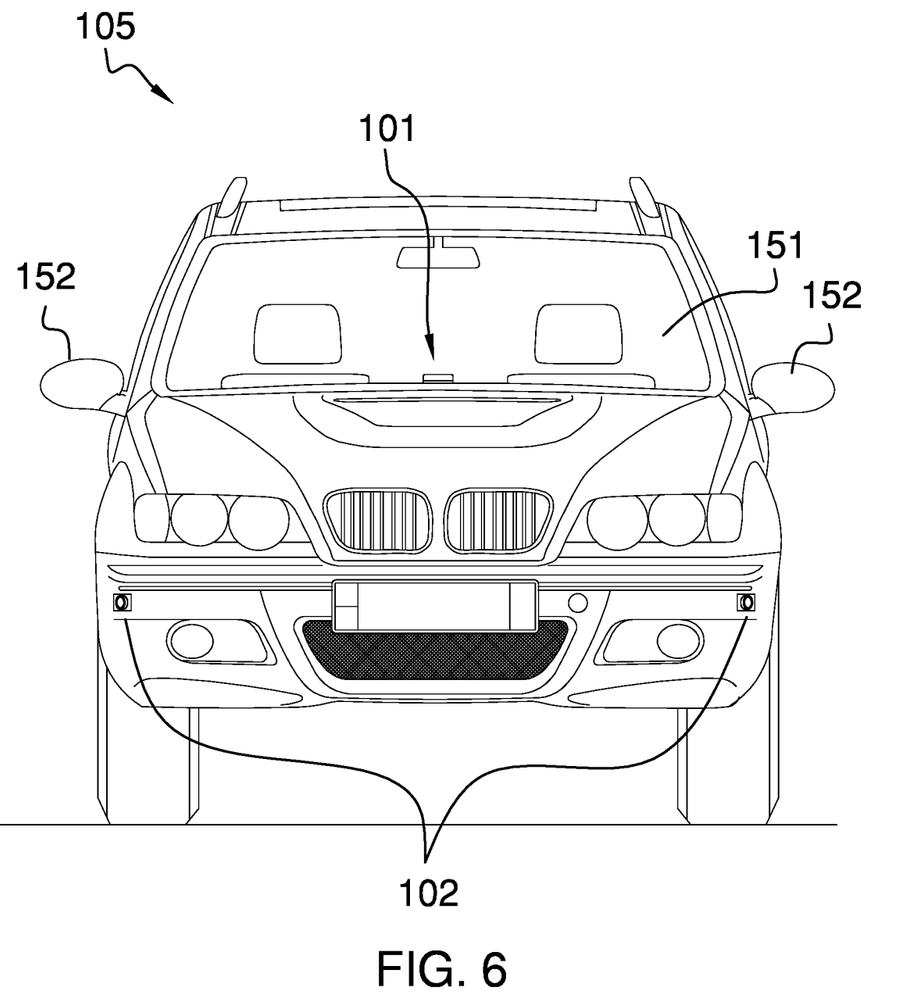
FIG. 6 is an in-use view of an embodiment of the disclosure.
Figure 7:
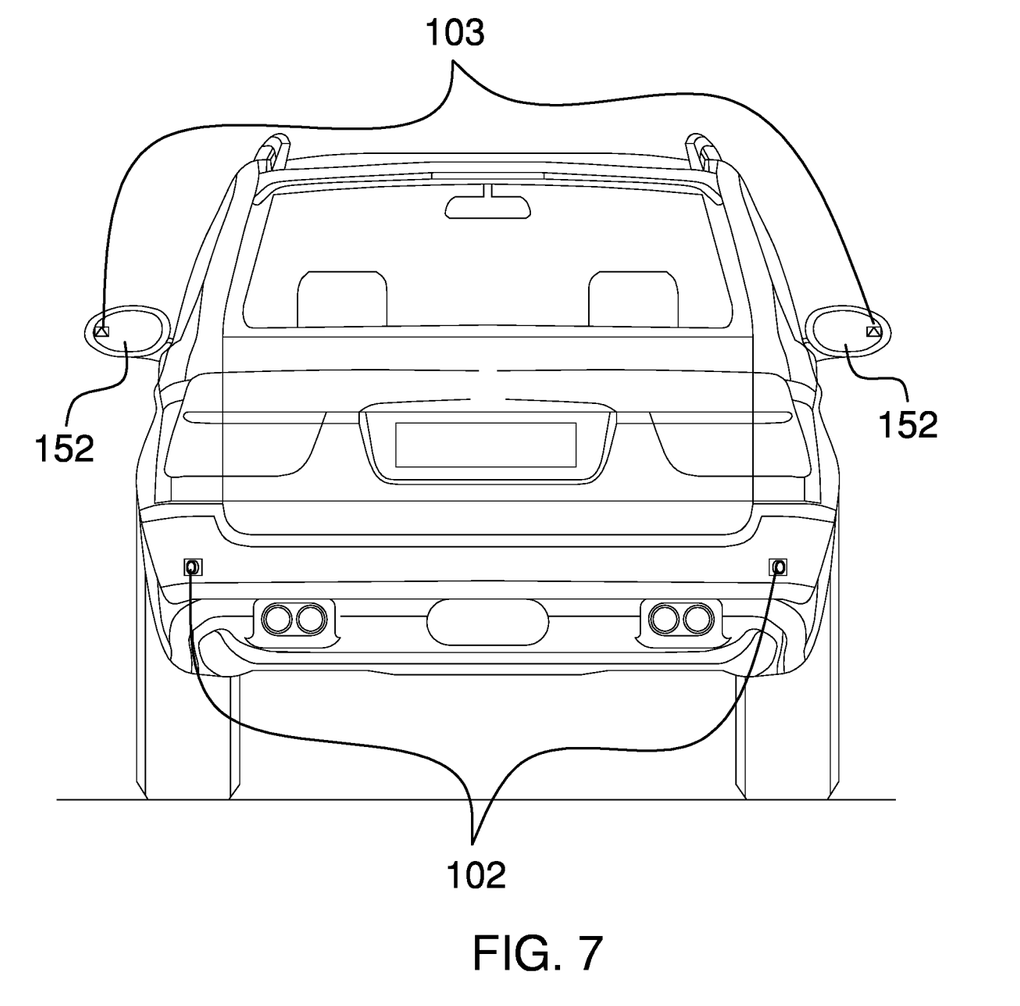
FIG. 7 is an in-use view of an embodiment of the disclosure.
Figure 8:
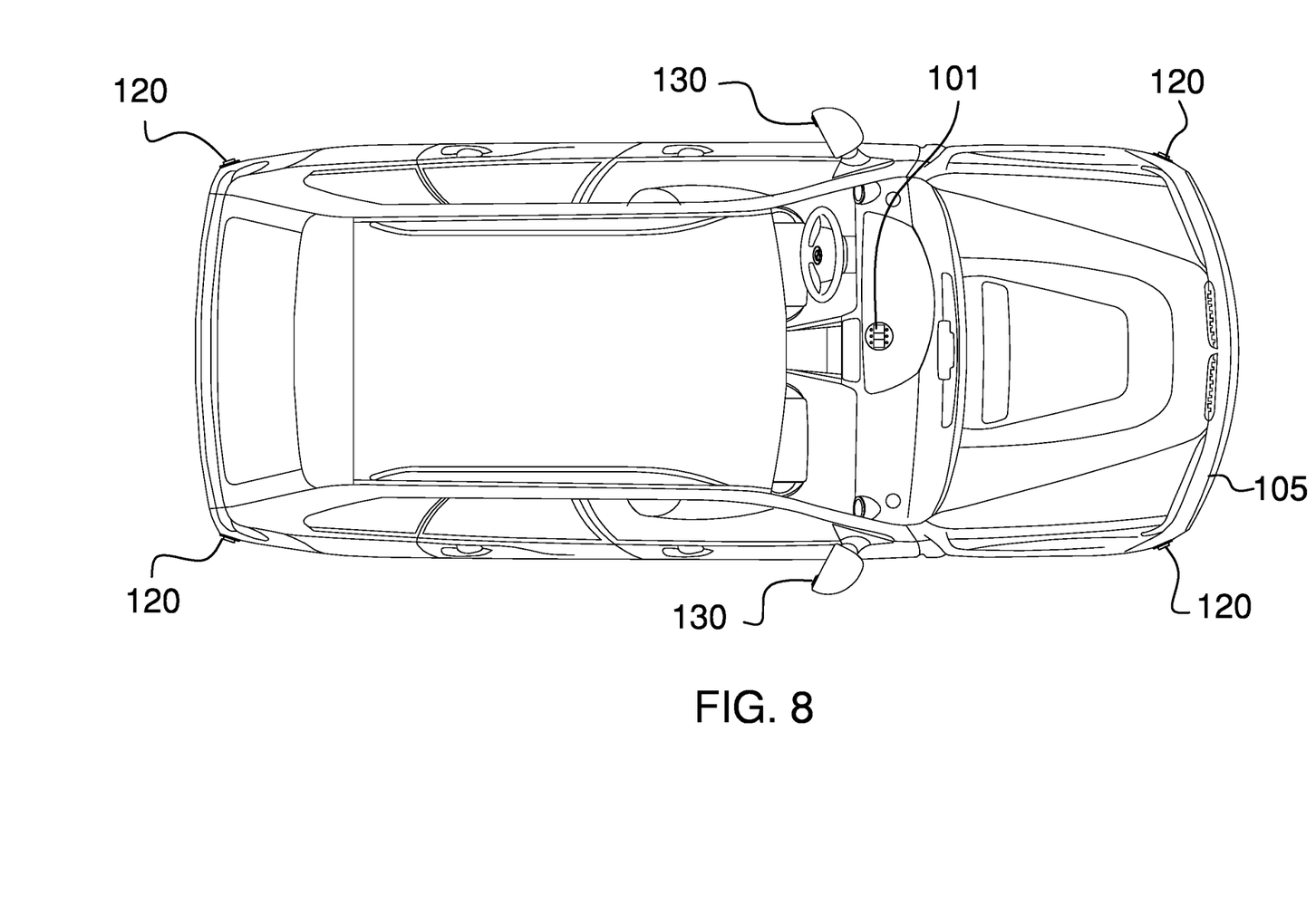
FIG. 8 is an in-use view of an embodiment of the disclosure.
Figure 9:
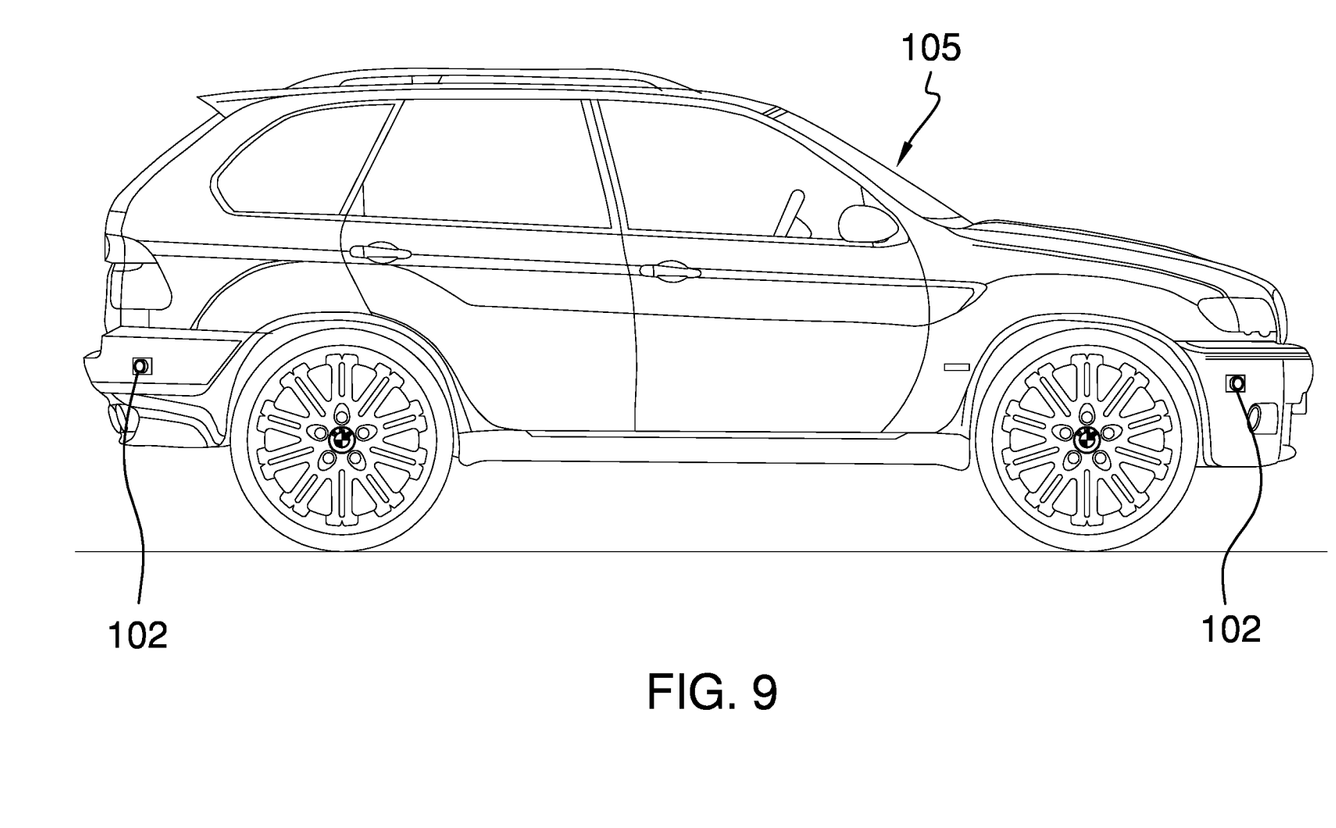
FIG. 9 is an in-use view of an embodiment of the disclosure.
Figure 10:
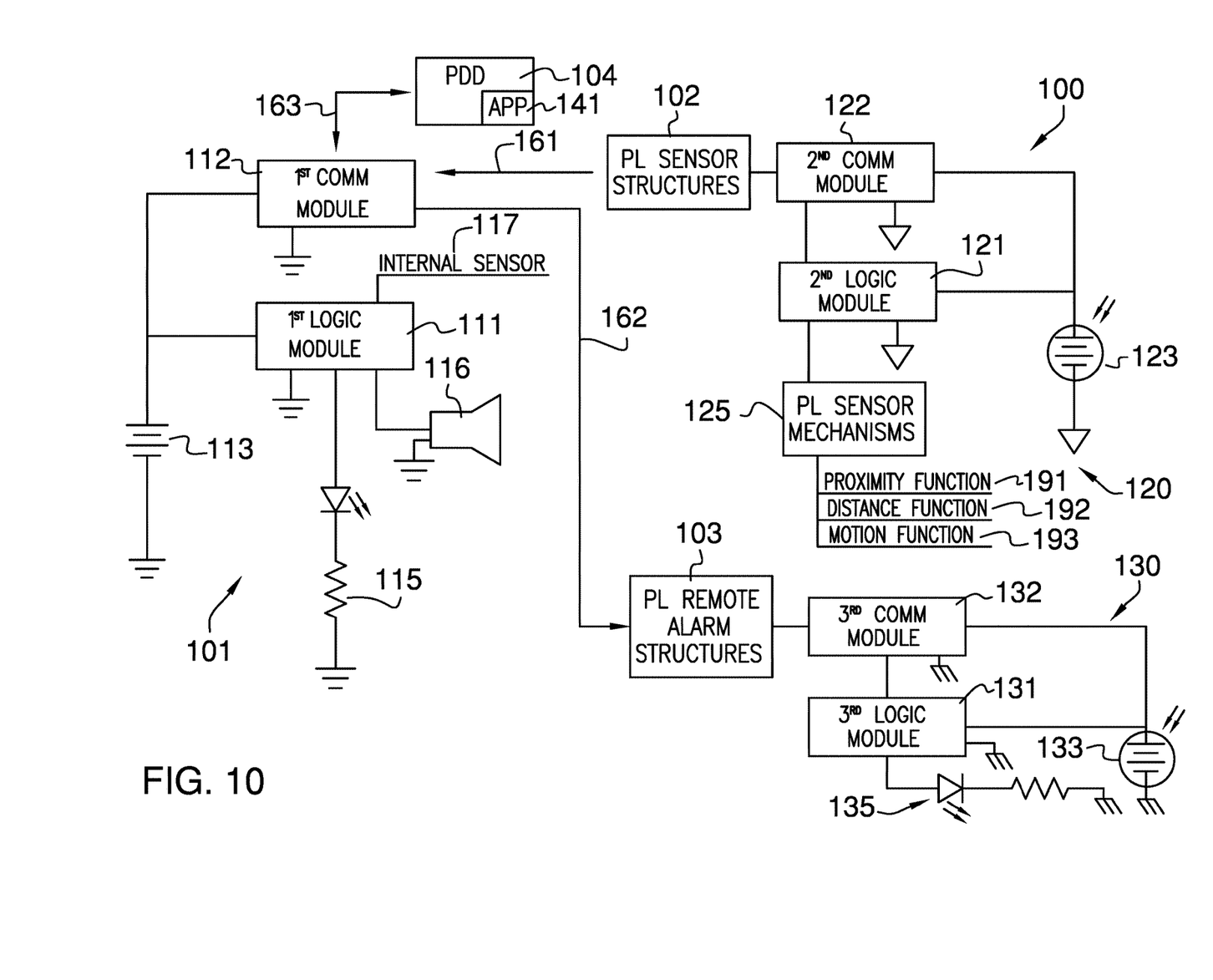
FIG. 10 is a schematic view of an embodiment of the disclosure.

Detailed reference will now be made to one or more potential embodiments of the disclosure, which are illustrated in FIGS. 1 through 10.

The vehicular blind spot warning system 100 (hereinafter invention) is a safety device. The invention 100 comprises a master alarm circuit 101, a plurality of sensor circuits 102, a plurality of remote alarm circuits 103, a personal data device 104, and a vehicle 105. The master alarm circuit 101 mounts in the vehicle 105. The plurality of sensor circuits 102 and the plurality of remote alarm circuits 103 mount on the exterior surface of the vehicle 105. The personal data device 104 forms a communication link with the master alarm circuit 101. The invention 100 monitors a 360 degree field of view around the vehicle 105. The invention 100 generates a plurality of audible and visible alarms when: a)

the invention 100 detects traffic that is near to the vehicle 105; and, b) the invention 100 detects traffic that is moving in a dangerous direction relative to the vehicle 105.

The vehicle 105 is a motorized device used to transport passengers and cargo over a road network. The vehicle 105 is defined elsewhere in this disclosure. The vehicle 105 further comprises a passenger cabin 151 and a plurality of side view mirrors 152. The passenger cabin 151 is an enclosed space formed within the vehicle 105. The passengers travel within the passenger cabin 151 of the vehicle 105. Each of the plurality of side view mirrors 152 is a side view mirror. The side view mirror is defined elsewhere in this disclosure. The master alarm circuit 101 mounts in the passenger cabin 151 of the vehicle 105. Each of the plurality of sensor circuits 102 mounts on the exterior surface of the vehicle 105. Each of the plurality of remote alarm circuits 103 mounts on a side view mirror selected from the plurality of side view mirrors 152 of the vehicle 105.

The personal data device 104 is a programmable electrical device. The personal data device 104 further comprises an application 141. The personal data device 104 provides data management and communication services through one or more functions referred to as an application 141. The application 141 is a set of logical operating instructions that are performed by the personal data device 104. The addition of an application 141 will provide increased functionality for the personal data device 104. This disclosure assumes that an application 141 exists for the purpose of interacting with the master alarm circuit 101. Methods to design and implement an application 141 on a personal data device 104 are well known and documented in the electrical arts. The personal data device 104 transmits operating instructions, including the desired frequency tones for the audible alarms generated by the master alarm circuit 101, over the third wireless communication link 163 to the master alarm circuit 101. The first communication module 112 receives the transmitted operating instructions and relays the received operating instructions to the first logic module 111.

The master alarm circuit 101 is an electric circuit. The master alarm circuit 101 forms a communication link with each of the plurality of sensor circuits 102. The master alarm circuit 101 forms a communication link with each of the plurality of remote alarm circuits 103. The master alarm circuit 101 forms a communication link with each of the personal data device 104.

The master alarm circuit 101 monitors the plurality of sensor circuits 102 to determine the proximity, distance, and direction of motion of the traffic surrounding the vehicle 105. The master alarm circuit 101 monitors the direction of motion of the vehicle 105 such that the master alarm circuit 101 can determine if the vehicle 105 is in a dangerous situation relative to the traffic surrounding the vehicle 105. The master alarm circuit 101 generates audible and visible alarms when the master alarm circuit 101 determines that the vehicle 105 is in a dangerous situation relative to the traffic surrounding the vehicle 105.

The master alarm circuit 101 transmits an alarm signal to the plurality of remote alarm circuits 103 when the master alarm circuit 101 determines that the vehicle 105 is in a dangerous situation relative to the traffic surrounding the vehicle 105. Each of the plurality of remote alarm circuits 103 generates a visible alarm when the master alarm circuit 101 transmits the alarm signal to the plurality of remote alarm circuits 103.

The master alarm circuit 101 comprises a first logic module 111, a first communication module 112, a first power circuit 113, a first housing 114, a first lamp circuit 115, a speaker circuit 116, and an inertial sensor 117. The first logic module 111, the first communication module 112, the first power circuit 113, the first lamp circuit 115, the speaker circuit 116, and the inertial sensor 117 are electrically interconnected. The first housing 114 contains the first logic module 111, the first communication module 112, the first power circuit 113, the first lamp circuit 115, the speaker circuit 116, and the inertial sensor 117.

The first logic module 111 is a readily and commercially available programmable electronic device that is used to manage, regulate, and operate the master alarm circuit 101. Depending on the specific design and the selected components, the first logic module 111 can be a separate component within the master alarm circuit 101 or the functions of the first logic module 111 can be incorporated into another component within the master alarm circuit 101. The first communication module 112 is a wireless electronic communication device that allows the first logic module 111 to wirelessly communicate with the plurality of sensor circuits 102, the plurality of remote alarm circuits 103, and the personal data device 104.

Specifically, the first communication module 112 establishes a first wireless communication link 161 between the master alarm circuit 101 and each individual sensor circuit 120 selected from the plurality of sensor circuits 102. The first communication module 112 further establishes a second wireless communication link 162 between the master alarm circuit 101 and each individual remote alarm circuit 130 selected from the plurality of remote alarm circuits 103. The first communication module 112 further establishes a third wireless communication link 163 between the master alarm circuit 101 and the personal data device 104. In the first potential embodiment of the disclosure, the first communication module 112 supports a communication protocol selected from the group consisting of a WiFi™ protocol or a Bluetooth™ protocol.

The first power circuit 113 is an electrical circuit. The first power circuit 113 powers the operation of the master alarm circuit 101. The first power circuit 113 forms an electric connection with the vehicle 105 electric system. The first power circuit 113 converts chemical potential energy into the electrical energy required to power the master alarm circuit 101. In the first potential embodiment of the disclosure, the first power circuit 113 is a battery.

The first housing 114 is a rigid structure. The first housing 114 contains the first logic module 111, the first communication module 112, the first power circuit 113, the first lamp circuit 115, the speaker circuit 116, and the inertial sensor 117. The first housing 114 is formed with all apertures and form factors necessary to allow the first housing 114 to accommodate the use and operation of the first logic module 111, the first communication module 112, the first power circuit 113, the first lamp circuit 115, the speaker circuit 116, and the inertial sensor 117. Methods to form a first housing 114 suitable for the purposes described in this disclosure are well-known and documented in the mechanical arts. The first housing 114 further comprises a first shell 171 and a first adhesive structure 181.

The first shell 171 is a rigid structure that forms the exterior protective surfaces of the first housing 114. The first adhesive structure 181 is an adhesive coating that is applied to the exterior surface of the first housing 114. The first adhesive structure 181 permanently secures the first shell 171 to a surface within the passenger cabin 151 of the vehicle 105.

The first logic module 111 electrically connects to the first lamp circuit 115. The first logic module 111 electrically connects to the speaker circuit 116. The first logic module 111 electrically connects to the inertial sensor 117.

The first lamp circuit 115 is an electric circuit. The first lamp circuit 115 generates an illumination. The first lamp circuit 115 mounts in the first housing 114 such that the illumination generated by the first lamp circuit 115 is visible from the exterior of the first housing 114. The first logic module 111 controls the operation of the first lamp circuit 115. The first logic module 111 illuminates the first lamp circuit 115 when the first logic module 111 determines that the vehicle 105 is in a dangerous situation relative to the traffic surrounding the vehicle 105. The illumination of the first lamp circuit 115 forms the visible alarm generated by the master alarm circuit 101.

The speaker circuit 116 is an electric circuit. The speaker circuit 116 generates an audible sound that forms the audible alarm. The speaker circuit 116 mounts in the first housing 114 such that the audible alarm generated by the speaker circuit 116 is audible through the exterior of the first housing 114. The first logic module 111 controls the operation of the speaker circuit 116. The first logic module 111 controls the frequency of the generated audible sound. The first logic module 111 generates the audible sound through the speaker circuit 116 when the first logic module 111 determines that the vehicle 105 is in a dangerous situation relative to the traffic surrounding the vehicle 105.

The inertial sensor 117 is a sensor. The inertial sensor 117 measures the inertia of the vehicle 105. The inertial sensor 117 measures the changes in the inertia of the vehicle 105. The first logic module 111 uses the inertial readings collected from the inertial sensor 117 to determine the direction of motion of the vehicle 105 relative to the traffic surrounding the vehicle 105. The first logic module 111 uses the inertial readings collected from the inertial sensor 117 to determine if the vehicle 105 is in a dangerous situation relative to the traffic surrounding the vehicle 105.

Each of the plurality of sensor circuits 102 is an electric circuit. Each of the plurality of sensor circuits 102 is a sensor. Each of the plurality of sensor circuits 102 covers a 360 degree field of view around the vehicle 105. Each of the plurality of sensor circuits 102 forms a communication link with the master alarm circuit 101. The plurality of sensor circuits 102 monitors the proximity of the traffic surrounding the vehicle 105. The plurality of sensor circuits 102 monitors the distance of the traffic surrounding the vehicle 105. The plurality of sensor circuits 102 monitors the direction of motion of the traffic surrounding the vehicle 105. The master alarm circuit 101 monitors each of the plurality of sensor circuits 102. The master alarm circuit 101 analyzes the data collected by the plurality of sensor circuits 102. The master alarm circuit 101 generates the audible and visible alarms based on the analysis of the data collected by the plurality of sensor circuits 102. The plurality of sensor circuits 102 further comprises a collection of individual sensor circuits 120.

The individual sensor circuit 120 is an electric circuit. The individual sensor circuit 120 covers a portion of the field of view of the traffic surrounding the vehicle 105. The field of view of any individual sensor circuit 120 selected from the plurality of sensor circuits 102 overlaps with the field view of any adjacent individual sensor circuit 120 selected from the plurality of sensor circuits 102. The individual sensor circuit 120 monitors the proximity of the traffic surrounding the vehicle 105. The individual sensor circuit 120 monitors the distance of the traffic surrounding the vehicle 105. The individual sensor circuit 120 monitors the direction of motion of the traffic surrounding the vehicle 105. The master alarm circuit 101 monitors each of the individual sensor circuit 120. The master alarm circuit 101 analyzes the data collected by the individual sensor circuit 120. The individual sensor circuit 120 is an independently powered electric circuit. By independently powered is meant that the individual sensor circuit 120 can operate without an electrical connection to an external power source.

Each individual sensor circuit 120 comprises a second logic module 121, a second communication module 122, a second power circuit 123, a second housing 124, and a plurality of sensor functions 125. The second logic module 121, the second communication module 122, the second power circuit 123, and the plurality of sensor functions 125 are electrically interconnected. The second housing 124 contains the second logic module 121, the second communication module 122, the second power circuit 123, and the plurality of sensor functions 125.

The second logic module 121 is a readily and commercially available programmable electronic device that is used to manage, regulate, and operate the individual sensor circuit 120. The second communication module 122 is a wireless electronic communication device that allows the second logic module 121 to wirelessly communicate with the master alarm circuit 101. Specifically, the second communication module 122 establishes the second wireless communication link 162 between the individual sensor circuit 120 and the master alarm circuit 101. In the first potential embodiment of the disclosure, the second communication module 122 supports a communication protocol selected from the group consisting of a WiFi™ protocol or a Bluetooth™ protocol.

The second power circuit 123 is an electrical circuit. The second power circuit 123 powers the operation of the individual sensor circuit 120. The second power circuit 123 is an electrochemical device. The second power circuit 123 converts electromagnetic radiation into chemical potential energy for storage. The second power circuit 123 subsequently converts the stored chemical potential energy into the electrical energy required to power the individual sensor circuit 120.

The second housing 124 is a rigid structure. The second housing 124 contains the second logic module 121, the second communication module 122, the second power circuit 123, and the plurality of sensor functions 125. The second housing 124 is formed with all apertures and form factors necessary to allow the second housing 124 to accommodate the use and operation of the second logic module 121, the second communication module 122, the second power circuit 123, and the plurality of sensor functions 125. Methods to form a second housing 124 suitable for the purposes described in this disclosure are well-known and documented in the mechanical arts. The second housing 124 further comprises a second shell 172 and a second adhesive structure 182.

The second shell 172 is a rigid structure that forms the exterior protective surfaces of the second housing 124. The second adhesive structure 182 is an adhesive coating that is applied to the exterior surface of the second housing 124. The second adhesive structure 182 permanently secures the second shell 172 to an exterior surface of the vehicle 105.

The plurality of sensor functions 125 forms an integrated electric circuit within the individual sensor circuit 120. The plurality of sensor functions 125 electrically connect to the second logic module 121. The plurality of sensor functions 125 senses the proximity of the traffic within the field of view of the individual sensor circuit 120. The plurality of sensor functions 125 senses the distance of the traffic within the field of view of the individual sensor circuit 120. The plurality of sensor functions 125 senses the direction of motion of the traffic within the field of view of the individual sensor circuit 120. The second logic module 121 collects the sensor data collected by the plurality of sensor functions 125 and transmits the collected data to the first communication module 112 of the master alarm circuit 101 over the first wireless communication link 161 for further processing.

The plurality of sensor functions 125 further comprises a proximity sensing function 191, a distance sensing function 192, and a motion sensing function 193. The proximity sensing function 191 is an electric circuit used to detect the proximity of the traffic surrounding the vehicle 105. The distance sensing function 192 is an electric circuit used to detect the distance of the traffic surrounding the vehicle 105 relative to the vehicle 105. The motion sensing function 193 is an electric circuit used to detect the direction of motion of the traffic surrounding the vehicle 105 relative to the vehicle 105.

The plurality of remote alarm circuits 103 is an electric circuit. The plurality of remote alarm circuits 103 forms a communication link with the master alarm circuit 101. The master alarm circuit 101 controls the operation of the plurality of remote alarm circuits 103. Each of the plurality of remote alarm circuits 103 receives the alarm signal transmitted by the master alarm circuit 101. Upon receipt of the alarm signal generated by the master alarm circuit 101, each of the plurality of remote alarm circuits 103 generates a visible alarm. The plurality of remote alarm circuits 103 further comprises a collection of individual remote alarm circuits 130.

Each individual remote alarm circuit 130 is an electric circuit. Each individual remote alarm circuit 130 mounts on a side view mirror selected from the plurality of side view mirrors 152 of the vehicle 105. The individual remote alarm circuit 130 receives the alarm signal transmitted by the first logic module 111 of the master alarm circuit 101 over the second wireless communication link 162. The individual remote alarm circuit 130 generates a visible illumination in response to receiving the alarm signal. The visible illumination generated by the individual remote alarm circuit 130 forms one or more of the visible alarms formed by the invention 100. The individual remote alarm circuit 130 is an independently powered electric circuit. By independently powered is meant that the individual remote alarm circuit 130 can operate without an electrical connection to an external power source.

Each individual remote alarm circuit 130 comprises a third logic module 131, a third communication module 132, a third power circuit 133, a third housing 134, and a second lamp circuit 135. The third logic module 131, the third communication module 132, the third power circuit 133, and the second lamp circuit 135 are electrically interconnected. The third housing 134 contains the third logic module 131, the third communication module 132, the third power circuit 133, and the second lamp circuit 135.

The third logic module 131 is a readily and commercially available programmable electronic device that is used to manage, regulate, and operate the individual remote alarm circuit 130. The third communication module 132 is a wireless electronic communication device that allows the third logic module 131 to wirelessly communicate with the master alarm circuit 101. Specifically, the third communication module 132 establishes the third wireless communication link 163 between the individual remote alarm circuit 130 and the master alarm circuit 101. In the first potential embodiment of the disclosure, the third communication module 132 supports a communication protocol selected from the group consisting of a WiFi™ protocol or a Bluetooth™ protocol.

The third power circuit 133 is an electrical circuit. The third power circuit 133 powers the operation of the individual remote alarm circuit 130. The third power circuit 133 is an electrochemical device. The third power circuit 133 converts electromagnetic radiation into chemical potential energy for storage. The third power circuit 133 subsequently converts the stored chemical potential energy into the electrical energy required to power the individual remote alarm circuit 130.

The third housing 134 is a rigid structure. The third housing 134 contains the third logic module 131, the third communication module 132, the third power circuit 133, and the second lamp circuit 135. The third housing 134 is formed with all apertures and form factors necessary to allow the third housing 134 to accommodate the use and operation of the third logic module 131, the third communication module 132, the third power circuit 133, and the second lamp circuit 135. Methods to form a third housing 134 suitable for the purposes described in this disclosure are well-known and documented in the mechanical arts. The third housing 134 further comprises a third shell 173 and a third adhesive structure 183.

The third shell 173 is a rigid structure that forms the exterior protective surfaces of the third housing 134. The third adhesive structure 183 is an adhesive coating that is applied to the exterior surface of the third housing 134. The third adhesive structure 183 permanently secures the third shell 173 to a side view mirror selected from the plurality of side view mirrors 152 of the vehicle 105.

The second lamp circuit 135 is an electric circuit. The second lamp circuit 135 generates an illumination. The second lamp circuit 135 mounts in the third housing 134 such that the illumination generated by the second lamp circuit 135 is visible from the exterior of the third housing 134. The third logic module 131 controls the operation of the second lamp circuit 135. The third logic module 131 illuminates the second lamp circuit 135 when the third logic module 131 receives the alarm signal from the master alarm circuit 101. The illumination of the second lamp circuit 135 forms one of the visible alarms generated by the master alarm circuit 101.

It shall be noted that the master alarm circuit 101 may include one of the plurality of sensor circuits 102 thereon so as to include additional locations where the sensor circuits 102 are able to operate. More specifically, the master alarm circuit 101 may include one of the individual sensor circuit 120 selected from the plurality of sensor circuits 102.

The following definitions were used in this disclosure:

Adhesive: As used in this disclosure, an adhesive is a chemical substance that can be used to adhere two or more objects to each other. Types of adhesives include, but are not limited to, epoxies, polyurethanes, polyimides, or cyanoacrylates, silicone, or latex based adhesives.

Application or App: As used in this disclosure, an application or app is a self-contained piece of software that is especially designed or downloaded for use with a personal data device.

Battery: As used in this disclosure, a battery is a chemical device consisting of one or more cells, in which chemical energy is converted into electricity and used as a source of power. Batteries are commonly defined with a positive terminal and a negative terminal.

Bluetooth™: As used in this disclosure, Bluetooth™ is a standardized communication protocol that is used to wirelessly interconnect electronic devices.

Communication Link: As used in this disclosure, a communication link refers to the structured exchange of data between two objects.

Distance Sensor: As used in this disclosure, a distance sensor is an electrical sensing device that detects the presence and distance of an object within the field of view of the distance sensor.

External Power Source: As used in this disclosure, an external power source is a source of the energy that is externally provided to enable the operation of the present disclosure. Examples of external power sources include, but are not limited to, electrical power sources and compressed air sources.

Field of View: As used in this disclosure, a field of view refers to one or more angles which delimits an area from which radiation will be sensed by a person or a sensor.

Form Factor: As used in this disclosure, the term form factor refers to the size and shape of an object.

Frequency: As used in this disclosure, frequency is a count of the number of repetitions of a cyclic process that are completed within a previously determined duration.

GPS: As used in this disclosure, and depending on the context, GPS refers to: 1) a system of navigational satellites that are used to determine the position, known as GPS coordinates, and velocity of a person or object; 2) the system of navigational satellites referred to in the first definition that are used to synchronize to global time; or, 3) an electronic device or that uses the system of navigational satellites referred to in the first definition to determine the position of a person or object. GPS is an acronym for Global Positioning System. Methods to determine the distance and direction between any two sets of GPS coordinates are well-known and documented in the navigational arts.

Housing: As used in this disclosure, a housing is a rigid structure that encloses and protects one or more devices.

Inertial Sensor: As used in this disclosure, an inertial sensor is a form of a force sensor that measures the change in the inertia of an object.

LED: As used in this disclosure, an LED is an acronym for a light emitting diode. A light emitting diode is a diode that is also a light source.

Load: As used in this disclosure, the term load refers to an object upon which a force is acting or which is otherwise absorbing energy in some fashion. Examples of a load in this sense include, but are not limited to, a mass that is being moved a distance or an electrical circuit element that draws energy. The term load is also commonly used to refer to the forces that are applied to a stationary structure.

Load Path: As used in this disclosure, a load path refers to a chain of one or more structures that transfers a load generated by a raised structure or object to a foundation, supporting surface, or the earth.

Logic Module: As used in this disclosure, a logic module is a readily and commercially available electrical device that accepts digital and analog inputs, processes the digital and analog inputs according to previously specified logical processes and provides the results of these previously specified logical processes as digital or analog outputs. The disclosure allows, but does not assume, that the logic module is programmable.

Motion Sensor: As used in this disclosure, a motion sensor refers to a commercially available sensor that generates an electrical signal should the motion sensor detect movement within its field of view.

Mount: As used in this disclosure, a mount is a mechanical structure that attaches or incorporates an object into a load path.

PDD: As used in this disclosure, PDD is an acronym for personal data device.

Personal Data Device: As used in this disclosure, a personal data device is a handheld logical device that is used for managing personal information and communication. Examples of personal data device include, but are not limited to, cellular phones, tablets, and smartphones.

Photovoltaic Cell: As used in this disclosure, a photovoltaic cell is a photoelectric device that directly converts light energy into electrical energy.

Proximity Sensor: As used in this disclosure, a proximity sensor is an electrical device that senses the entry or presence of an object within a previously determined field of view.

Sensor: As used in this disclosure, a sensor is a device that receives and responds in a predetermined way to a signal or stimulus. As further used in this disclosure, a threshold sensor is a sensor that generates a signal that indicates whether the signal or stimulus is above or below a given threshold for the signal or stimulus.

Shell: As used in this disclosure, a shell is a structure that forms an outer covering intended to contain an object. Shells are often, but not necessarily, rigid or semi-rigid structures that are intended to protect the object contained within it.

Side View Mirror: As used in this disclosure, a side view mirror is a mirror configured for use with a vehicle. The rearview mounts on a side of the vehicle selected from the group consisting of the port side and the starboard side. The side view mirror mounts on the vehicle such that the operator of the vehicle can look into the side view mirror to see towards the aft of the vehicle without turning around.

Speaker: As used in this disclosure, a speaker is an electrical transducer that converts an electrical signal into an audible sound.

Transducer: As used in this disclosure, a transducer is a device that converts a physical quantity, such as pressure or brightness into an electrical signal or a device that converts an electrical signal into a physical quantity.

WiFi™: As used in this disclosure, WiFi™ refers to the physical implementation of a collection of wireless electronic communication standards commonly referred to as IEEE 802.11x.

Wireless: As used in this disclosure, wireless is an adjective that is used to describe a communication link between two devices that does not require the use of physical cabling.

With respect to the above description, it is to be realized that the optimum dimensional relationship for the various components of the invention described above and in FIGS. 1 through 10 include variations in size, materials, shape, form, function, and manner of operation, assembly and use, are deemed readily apparent and obvious to one skilled in the art, and all equivalent relationships to those illustrated in the drawings and described in the specification are intended to be encompassed by the invention.

It shall be noted that those skilled in the art will readily recognize numerous adaptations and modifications which can be made to the various embodiments of the present invention which will result in an improved invention, yet all of which will fall within the spirit and scope of the present invention as defined in the following claims. Accordingly, the invention is to be limited only by the scope of the following claims and their equivalents.

What is claimed is:

1. A vehicular blind spot warning system for a vehicle comprising:
    a master alarm circuit, a plurality of sensor circuits, a plurality of remote alarm circuits, and a personal data device;
    wherein the master alarm circuit mounts in the vehicle;
    wherein the plurality of sensor circuits and the plurality of remote alarm circuits removably mount on the exterior surface of the vehicle;
    wherein the personal data device forms a wireless communication link with the master alarm circuit;
    wherein the vehicular blind spot warning system generates a plurality of audible and visible alarms when the vehicular blind spot warning system detects traffic that is near to the vehicle; and
    wherein the vehicular blind spot warning system further comprising an application residing on the personal data device which wirelessly sets operating instructions for the master alarm circuit.

2. The vehicular blind spot warning system according to claim 1,
    wherein the vehicular blind spot warning system monitors a 360 degree field of view around the vehicle;
    wherein the vehicular blind spot warning system generates the plurality of audible and visible alarms when the vehicular blind spot warning system detects traffic that is moving in a dangerous 2 direction relative to the vehicle.

3. The vehicular blind spot warning system according to claim 2
    wherein the vehicle further comprises a passenger cabin and a plurality of side view mirrors;
    wherein the passenger cabin is an enclosed space formed within the vehicle;
    wherein each of the plurality of side view mirrors is a side view mirror;
    wherein each of the plurality of remote alarm circuits mounts on a side view mirror selected from the plurality of side view mirrors of the vehicle.

4. The vehicular blind spot warning system according to claim 3, wherein the operating instructions further comprise the personal data device transmitting desired frequency tones for the audible alarms to the master alarm circuit.

5. The vehicular blind spot warning system according to claim 4
    wherein the master alarm circuit is an electric circuit;
    wherein the master alarm circuit forms a communication link with each of the plurality of sensor circuits;
    wherein the master alarm circuit forms a communication link with each of the plurality of remote alarm circuits;
    wherein the master alarm circuit forms a communication link with each of the personal data device;
    wherein the master alarm circuit monitors the plurality of sensor circuits to determine the proximity, distance, and direction of motion of the traffic surrounding the vehicle;
    wherein the master alarm circuit monitors the direction of motion of the vehicle such that the master alarm circuit can determine if the vehicle is in a dangerous situation relative to the traffic surrounding the vehicle;
    wherein the master alarm circuit generates the audible and visible alarms when the master alarm circuit determines that the vehicle is in the dangerous situation relative to the traffic surrounding the vehicle;
    wherein the master alarm circuit transmits an alarm signal to the plurality of remote alarm circuits when the master alarm circuit determines that the vehicle is in the dangerous situation relative to the traffic surrounding the vehicle;
    wherein each of the plurality of remote alarm circuits generates a visible alarm when the master alarm circuit transmits the alarm signal to the plurality of remote alarm circuits.

6. The vehicular blind spot warning system according to claim 5
    wherein each of the plurality of sensor circuits is an electric circuit;
    wherein each of the plurality of sensor circuits is a sensor;
    wherein the plurality of sensor circuits monitors the proximity of the traffic surrounding the vehicle;
    wherein the plurality of sensor circuits monitors the distance of the traffic surrounding the vehicle;
    wherein the plurality of sensor circuits monitors the direction of motion of the traffic surrounding the vehicle;
    wherein the master alarm circuit monitors each of the plurality of sensor circuits;
    wherein the master alarm circuit analyzes the data collected by the plurality of sensor circuits;
    wherein the master alarm circuit generates the audible and visible alarms based on the analysis of the data collected by the plurality of sensor circuits.

7. The vehicular blind spot warning system according to claim 6
    wherein the plurality of remote alarm circuits is an electric circuit;
    wherein the plurality of remote alarm circuits forms a communication link with the master alarm circuit;
    wherein the master alarm circuit controls the operation of the plurality of remote alarm circuits;
    wherein each of the plurality of remote alarm circuits receives the alarm signal transmitted by the master alarm circuit;
    wherein upon receipt of the alarm signal generated by the master alarm circuit, each of the plurality of remote alarm circuits generates a visible alarm.

8. The vehicular blind spot warning system according to claim 7
    wherein the master alarm circuit comprises a first logic module, a first communication module, a first power circuit, a first housing, a first lamp circuit, a speaker circuit, and an inertial sensor;
    wherein the first logic module, the first communication module, the first power circuit, the first lamp circuit, the speaker circuit, and the inertial sensor are electrically interconnected;
    wherein the first housing contains the first logic module, the first communication module, the first power circuit, the first lamp circuit, the speaker circuit, and the inertial sensor.

9. The vehicular blind spot warning system according to claim 8
    wherein the plurality of sensor circuits further comprises a collection of individual sensor circuits;
    wherein the individual sensor circuit is an electric circuit;
    wherein the individual sensor circuit covers a portion of the field of view of the traffic surrounding the vehicle;
    wherein the field of view of any individual sensor circuit selected from the plurality of sensor circuits overlaps with the field view of any adjacent individual sensor circuit selected from the plurality of sensor circuits;
    wherein the individual sensor circuit monitors the proximity of the traffic surrounding the vehicle;

wherein the individual sensor circuit monitors the distance of the traffic surrounding the vehicle;
wherein the individual sensor circuit monitors the direction of motion of the traffic surrounding the vehicle;
wherein the master alarm circuit monitors each individual sensor circuit;
wherein the master alarm circuit analyzes the data collected by the individual sensor circuit;
wherein the individual sensor circuit is an independently powered electric circuit;
wherein by independently powered is meant that the individual sensor circuit can operate without an electrical connection to an external power source.

10. The vehicular blind spot warning system according to claim 9
wherein the plurality of remote alarm circuits further comprises a collection of individual remote alarm circuits;
wherein each individual remote alarm circuit is an electric circuit;
wherein each individual remote alarm circuit mounts on a side view mirror selected from the plurality of side view mirrors of the vehicle;
wherein the individual remote alarm circuit receives the alarm signal transmitted by the first logic module of the master alarm circuit over the second wireless communication link;
wherein the individual remote alarm circuit generates a visible illumination in response to receiving the alarm signal;
wherein the visible illumination generated by the individual remote alarm circuit forms one or more of the visible alarms formed by the vehicular blind spot warning system;
wherein the individual remote alarm circuit is an independently powered electric circuit;
wherein by independently powered is meant that the individual remote alarm circuit can operate without an electrical connection to an external power source.

11. The vehicular blind spot warning system according to claim 10
wherein each individual sensor circuit comprises a second logic module, a second communication module, a second power circuit, a second housing, and a plurality of sensor functions;
wherein the second logic module, the second communication module, the second power circuit, and the plurality of sensor functions are electrically interconnected;
wherein the second housing contains the second logic module, the second communication module, the second power circuit, and the plurality of sensor functions.

12. The vehicular blind spot warning system according to claim 11
wherein each individual remote alarm circuit comprises a third logic module, a third communication module, a third power circuit, a third housing, and a second lamp circuit;
wherein the third logic module, the third communication module, the third power circuit, and the second lamp circuit are electrically interconnected;
wherein the third housing contains the third logic module, the third communication module, the third power circuit, and the second lamp circuit.

13. The vehicular blind spot warning system according to claim 12
wherein the first logic module is a programmable electronic device;
wherein the first communication module is a wireless electronic communication device that allows the first logic module to wirelessly communicate with the plurality of sensor circuits, the plurality of remote alarm circuits, and the personal data device;
wherein the first communication module establishes a first wireless communication link between the master alarm circuit and each individual sensor circuit selected from the plurality of sensor circuits;
wherein the first communication module further establishes a second wireless communication link between the master alarm circuit and each individual remote alarm circuit selected from the plurality of remote alarm circuits;
wherein the first communication module further establishes a third wireless communication link between the master alarm circuit and the personal data device;
wherein the first power circuit is an electrical circuit;
wherein the first power circuit powers the operation of the master alarm circuit;
wherein the first housing is a rigid structure;
wherein the first housing contains the first logic module, the first communication module, the first power circuit, the first lamp circuit, the speaker circuit, and the inertial sensor.

14. The vehicular blind spot warning system according to claim 13
wherein the first logic module electrically connects to the first lamp circuit;
wherein the first logic module electrically connects to the speaker circuit;
wherein the first logic module electrically connects to the inertial sensor;
wherein the first lamp circuit is an electric circuit;
wherein the first lamp circuit generates an illumination;
wherein the first logic module controls the operation of the first lamp circuit;
wherein the first logic module illuminates the first lamp circuit when the first logic module determines that the vehicle is in the dangerous situation relative to the traffic surrounding the vehicle;
wherein the speaker circuit is an electric circuit;
wherein the speaker circuit generates an audible sound that forms the audible alarm;
wherein the speaker circuit mounts in the first housing such that the audible alarm generated by the speaker circuit is audible through the exterior of the first housing;
wherein the first logic module controls the operation of the speaker circuit;
wherein the inertial sensor is a sensor;
wherein the inertial sensor measures the inertia of the vehicle;
wherein the inertial sensor measures the changes in the inertia of the vehicle.

15. The vehicular blind spot warning system according to claim 14
wherein the second logic module is a programmable electronic device;
wherein the second communication module is a wireless electronic communication device that allows the second logic module to wirelessly communicate with the master alarm circuit;

wherein the second communication module establishes the second wireless communication link between the individual sensor circuit and the master alarm circuit;

wherein the second power circuit is an electrical circuit;

wherein the second power circuit powers the operation of the individual sensor circuit;

wherein the second power circuit is an electrochemical device;

wherein the second power circuit converts electromagnetic radiation into chemical potential energy for storage;

wherein the second power circuit subsequently converts the stored chemical potential energy into the electrical energy required to power the individual sensor circuit;

wherein the second housing is a rigid structure;

wherein the second housing contains the second logic module, the second communication module, the second power circuit, and the plurality of sensor functions.

16. The vehicular blind spot warning system according to claim 15 wherein the plurality of sensor functions forms an integrated electric circuit within the individual sensor circuit;

wherein the plurality of sensor functions electrically connect to the second logic module;

wherein the plurality of sensor functions senses the proximity of the traffic within the field of view of the individual sensor circuit;

wherein the plurality of sensor functions senses the distance of the traffic within the field of view of the individual sensor circuit;

wherein the plurality of sensor functions senses the direction of motion of the traffic within the field of view of the individual sensor circuit;

wherein the second logic module collects the sensor data collected by the plurality of sensor functions and transmits the collected data to the first communication module of the master alarm circuit over the first wireless communication link for further processing;

wherein the plurality of sensor functions further comprises a proximity sensing function, a distance sensing function, and a motion sensing function;

wherein the proximity sensing function is an electric circuit used to detect the proximity of the traffic surrounding the vehicle;

wherein the distance sensing function is an electric circuit used to detect the distance of the traffic surrounding the vehicle relative to the vehicle;

wherein the motion sensing function is an electric circuit used to detect the direction of motion of the traffic surrounding the vehicle relative to the vehicle.

17. The vehicular blind spot warning system according to claim 16 wherein the third logic module is a programmable electronic device;

wherein the third communication module is a wireless electronic communication device that allows the third logic module to wirelessly communicate with the master alarm circuit;

wherein specifically, the third communication module establishes the third wireless communication link between each individual remote alarm circuit and the master alarm circuit;

wherein the third power circuit is an electrical circuit;

wherein the third power circuit powers the operation of the individual remote alarm circuit;

wherein the third power circuit is an electrochemical device;

wherein the third power circuit converts electromagnetic radiation into chemical potential energy for storage;

wherein the third power circuit subsequently converts the stored chemical potential energy into the electrical energy required to power the individual remote alarm circuit;

wherein the third housing is a rigid structure;

wherein the third housing contains the third logic module, the third communication module, the third power circuit, and the second lamp circuit.

18. The vehicular blind spot warning system according to claim 17 wherein the second lamp circuit is an electric circuit;

wherein the second lamp circuit generates an illumination;

wherein the second lamp circuit mounts in the third housing such that the illumination generated by the second lamp circuit is visible from the exterior of the third housing;

wherein the third logic module controls the operation of the second lamp circuit;

wherein the third logic module illuminates the second lamp circuit when the third logic module receives the alarm signal from the master alarm circuit;

wherein the illumination of the second lamp circuit forms one of the visible alarms generated by the master alarm circuit.

19. The vehicular blind spot warning system according to claim 18 wherein the master alarm circuit includes one of the individual sensor circuit selected from the plurality of sensor circuits.

* * * * *